Nov. 8, 1955
R. L. HARVEY
2,723,239
FERROSPINEL COMPOSITIONS
Filed Sept. 29, 1952
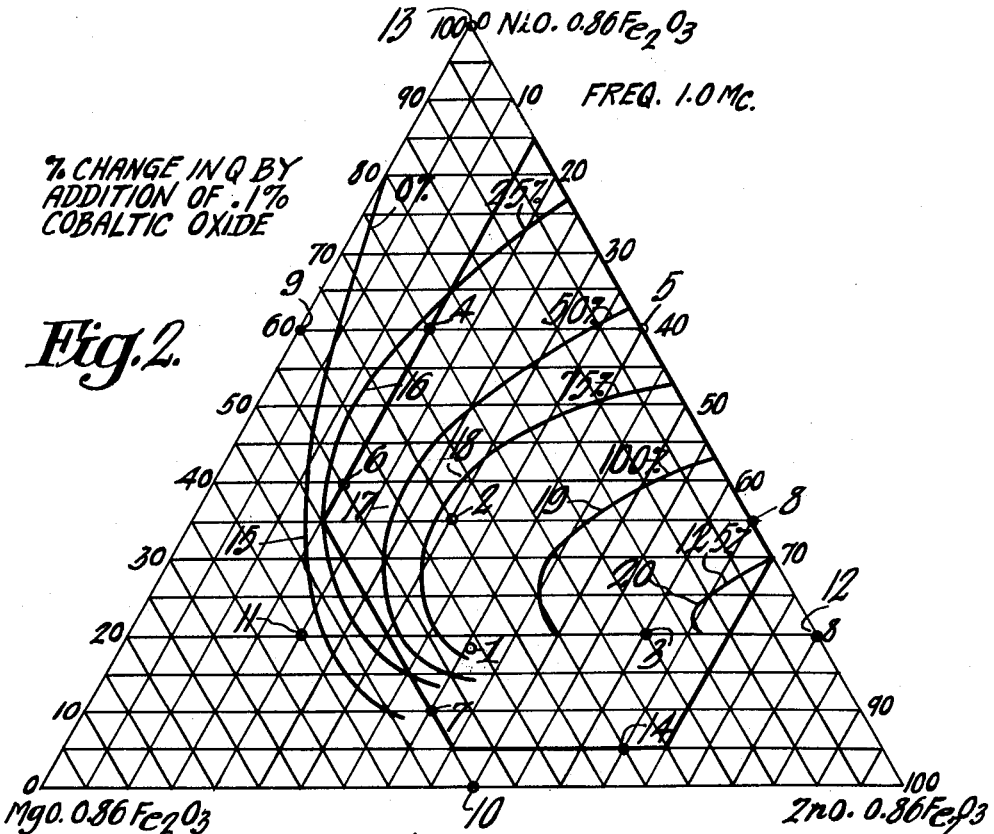
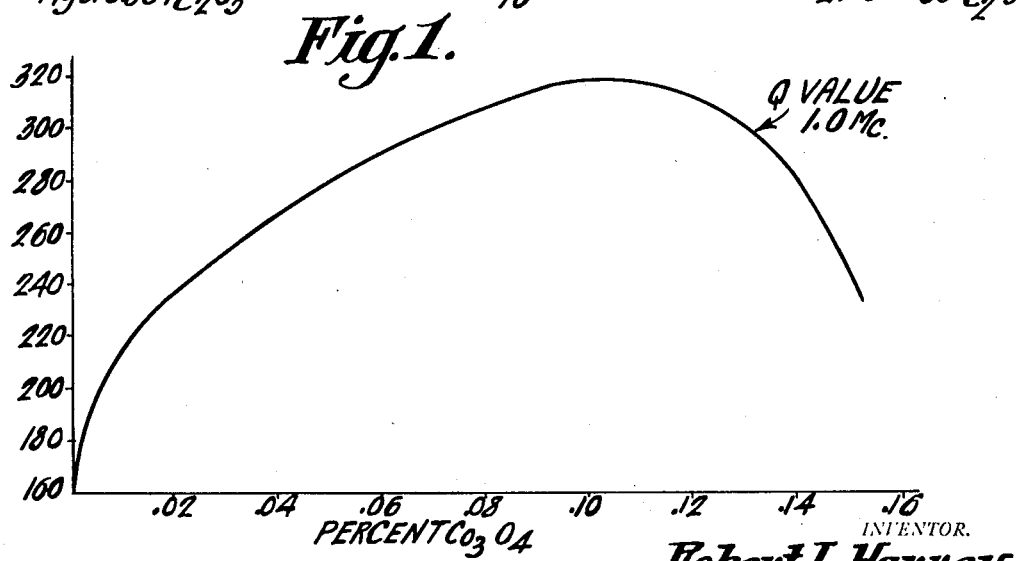
INVENTOR.
Robert L. Harvey
BY J. L. Whittaker
ATTORNEY 2,723,239
Patented Nov. 8, 1955

2,723,239

FERROSPINEL COMPOSITIONS

Robert L. Harvey, Princeton, N. J., assignor to Radio Corporation of America, a corporation of Delaware Application September 29, 1952, Serial No. 312,089

7 Claims. (Cl. 252—62.5)

This invention relates to improved ferrospinel compositions, also known as ferrites, and more particularly to improved ferrospinel compositions having exceptionally small electrical losses.

Previously, many different ferrospinel compositions have been developed and described, having differing advantageous magnetic properties, and some being better adapted than others to particular uses.

In certain high frequency applications it is desirable to provide a magnetic material having relatively small electrical losses and reasonably high magnetic permeability.

It has now been discovered that the addition of a relatively small amount of $Co_3O_4$ to the mix in the preparation of a magnesium-zinc-nickel ferrospinel composition provides a final product having exceptionally small electrical losses and a satisfactory permeability.

An object of the invention is to provide a ferrospinel composition having greatly improved electrical characteristics.

Another object of the invention is to provide a ferrospinel composition having exceptionally low electrical loss characteristics together with a reasonably high magnetic permeability.

Another object of the invention is to provide a ferrospinel composition having properties particularly suitable for use in high frequency applications (0.5 megacycle and upwards) such as, for example, loop antennae cores, and high frequency inductor and transformer cores.

These and other objects will be more readily apparent and the invention more easily understood by reference to the following detailed description and the drawings, of which:

Figure 1 shows a curve describing the values of the Q (ratio of apparent reactance to apparent resistance in a reactive device) obtained in sample bars of a nickel-zinc-magnesium ferrospinel composition prepared with the addition of varying amounts of $Co_3O_4$.

Figure 2 is a diagram showing a family of curves describing the increase in Q obtained by adding 0.1 percent by weight $Co_3O_4$ in the preparation of a large number of different ferrospinel compositions comprising nickel, zinc, magnesium and iron oxides.

In ferrospinel compositions of the nickel-zinc and nickel-zinc-magnesium classes, the addition of a relatively minute amount of $Co_3O_4$ provides a core material which in a reactive device provides an improved value of Q, or decreased electrical losses, and a not excessively diminished magnetic permeability. This is true of those compositions containing less than about 57 mole percent MgO, and at least about 5 mole percent NiO.

In a preferred embodiment of the invention a mixture of metallic oxides in the molar proportions of $$0.18NiO : 0.41ZnO : 0.41MgO : 0.86Fe_2O_3$$

is intimately mixed together with a quantity of $Co_3O_4$ equal to about 0.1 percent by weight of the total, and sintered for about one hour at 900° C. The sintered mix is wet ball milled and then plasticized by an addition of about 4 percent by weight of a water emulsion of paraffin. The mix is then molded by pressing and fired at 1050° C. for three hours in a non-reducing atmosphere and slow cooled.

Articles made in the above described manner were tested in a typical reactance device and were found to exhibit at Q at 1 megacycle of 320, and an initial permeability ($\mu_0$) of 104. These values may be compared with the corresponding values observed in a molded body prepared in exactly like manner as the preferred embodiment but without the addition of $Co_3O_4$ in its preparation, in which case $Q=170$ and $\mu_0=140$. It will be seen that a substantial increase in Q (decrease in electrical losses) has been attained without an excessive sacrifice of permeability.

The same ferrospinel composition may be prepared according to the same proportions of basic ingredients but with the addition of different amounts of $Co_3O_4$. By reference to the curve of Figure 1 it will be seen that a maximum value of Q (minimum losses) is obtained in a typical reactance device utilizing a magnetic core of material according to the instant invention when about 0.1 percent by weight $Co_3O_4$ is added to the composition, and that the addition of $Co_3O_4$ in excess of about 0.16 percent by weight results in no appreciable improvement.

While the curve of Figure 1 describes the variation obtained in electrical losses upon varying the proportion of $Co_3O_4$ added to a particular ferrospinel, Figure 2 describes generally the variations in electrical losses obtained by adding a fixed proportion (0.1 percent by weight) $Co_3O_4$ to different ferrospinel compositions. Some of the materials used in plotting the curves of Figure 2 are listed in the table together with their properties. All measurements from which the data of the table and of Figure 2 were derived were made on toroids having the dimensions of 2.6 cm. outside diameter, 2.2 cm. inside diameter, and 0.2 cm. long. The curves of Figure 2 are only rough approximations, based to some extent on visual interpolation between points actually plotted.

Figure 2 represents, first of all, all possible combinations within the ternary system $$(NiO \cdot ZnO \cdot MgO) \cdot 0.86Fe_2O_3$$

Upon this system representation have been superimposed curves, each of which shows all compositions found to exhibit a particular proportionate increase in the value of Q upon the addition of 0.1 percent by weight $Co_3O_4$ in their preparation. For example, the curve designated 19 has been drawn through all points representing all compositions within the ternary system that exhibit a relative increase in Q of 100 percent upon the addition of 0.1 percent by weight $Co_3O_4$ in their preparation. Since these curves have been drawn based on visual interpolation between known points, the known points themselves have been indicated in order to make clear the degree of approximation used in plotting the curves. The specimens listed in the table correspond by number to these points.

Table

| Specimen Number | Composition—Molar Proportions | | | | $\mu_0$ | Q at 1 mc. | 0.1% by wt. Co$_3$O$_4$ added | | Percent change in Q |
| --- | --- | --- | --- | --- | --- | --- | --- | --- | --- |
| | NiO | ZnO | MgO | Fe$_2$O$_3$ | | | $\mu_0$ | Q at 1 mc. | |
| 1 | .18 | .41 | .41 | .86 | 140 | 83 | 104 | 154 | 85.5 |
| 2 | .35 | .30 | .35 | .86 | 100 | 59 | 76 | 178 | 78 |
| 3 | .20 | .60 | .20 | .86 | 383 | 39 | 273 | 85 | 118 |
| 4 | .60 | .15 | .25 | .86 | 15.5 | 82 | 13.3 | 104 | 21 |
| 5 | .60 | .40 | 0 | .86 | 100 | 89 | 84 | 137 | 54 |
| 6 | .40 | .15 | .45 | .86 | 15.4 | 76 | 26.0 | 102 | 34 |
| 7 | .10 | .41 | .50 | .86 | 197 | 56 | 175 | 62 | 10 |
| 8 | .35 | .65 | 0 | .86 | 418 | 43 | 314 | 99 | 113 |
| 9 | .60 | 0 | .40 | .86 | 960 | 71 | 650 | 66 | −7 |

By reference to the table and to Figure 2, it will be seen that the practice of the invention provides an increased value of Q in a wide variety of different compositions within the ternary system described. In general, an improvement is noted in all compositions of the system comprising the molar proportions of 0.05 to 0.9 NiO, 0.15 to 0.7 ZnO, and less than 0.5 MgO. The points of the diagram of Figure 2 representing compositions within this range have been enclosed by a heavy line.

For purposes of illustrating the improvement obtainable through the practice of the invention the ternary system chosen and illustrated in Figure 2 is one found to have generally desirable magnetic properties. However, there are four variables in the system and it is convenient to illustrate variations of only three in a two dimensional curve. It should be understood that the practice of the invention is advantageous also throughout a range of different proportions of Fe$_2$O$_3$ in the composition. In general this range may be said to extend from 0.8 mole part to 1.0 mole part Fe$_2$O$_3$. The particular proportion of Fe$_2$O$_3$ most desirable in a composition may also depend somewhat upon the proportions of the other metallic oxides and upon other factors, such as firing time and temperature, and the rate of cooling of the shaped bodies.

By reference to Figure 1 it will be seen also that the proportion of added Co$_3$O$_4$ necessary to provide an increase in Q value is also variable. Generally, the addition of any amount from about 0.01 percent to about 0.16 percent by weight provides a useful increase in Q value. However, better results are obtained within somewhat narrower limits, say between 0.07 percent and 0.13 percent by weight Co$_3$O$_4$. In the practice of the invention using the composition of the preferred embodiment optimum results are obtained when about 0.1 percent by weight Co$_3$O$_4$ is added.

The action of the Co$_3$O$_4$ is not definitely understood. It is believed not to be the action commonly associated with so-called flux materials, since other materials generally known as excellent fluxes, such as, for instance, the oxides of copper, manganese, and silicon have been similarly added to these same ferrospinel materials and have not produced the same results. It is thought that the improvement effected results from the introduction of the cobalt ion in to the regular crystal lattice of the mixed ferrospinel.

It should be understood that the invention is not limited to the addition of Co$_3$O$_4$ to the ferrospinel mix. Any cobalt-bearing substance capable of forming Co$_3$O$_4$ when heated under non-reducing conditions may be used in place of Co$_3$O$_4$, such as, for instance, Co$_2$O$_3$. It is only necessary to adjust the amount of the substituted substance so that it will form the desired amount of Co$_3$O$_4$ when heated in the forming process.

It should also be understood that the method of preparation of the formed bodies may be varied greatly without departing from the spirit and scope of the invention. For example, any of a large number of binder materials may be used, or the binder may be omitted altogether; and the maturing temperature may be varied over wide limits, generally between 900° C. and 1400° C.; and the molding may be by any practicable method. The method of forming the shaped body and maturing the composition is not peculiar to the invention except in the respect that the practice of the invention requires the maturing to be carried out under non-reducing conditions.

There is no single preferred composition associated with the invention. The selection of a particular composition will depend largely upon the application to which it is to be put. In certain instances, the composition described in the preferred embodiment, shown as point 2 of Figure 2, and listed as specimen number 2 in the table, would be selected because of its excellent Q value. In other instances it may be desirable to select the composition represented by point 8 of Figure 2 and listed as specimen number 8 in the table, because of its high $\mu$ value. In other instances it may be desirable to select still other compositions because of other considerations.

There has thus been described a new and improved ferrospinel composition having desirable electrical loss characteristics and being especially suitable for use in high frequency applications.

What is claimed is:

1. A composition of matter consisting essentially of the reaction product formed by heating an intimate mixture of 0.01 percent to 0.16 percent by weight Co$_3$O$_4$ and the molar proportions of 0.15 to 0.7 ZnO, 0.0 to 0.5 MgO, 0.05 to 0.9 NiO, 0.8 to 1.0 Fe$_2$O$_3$ for at least one hour at 900° C. to 1400° C. under non-reducing conditions.

2. A composition of matter consisting essentially of the reaction product formed by heating an intimate mixture of 0.01 percent to 0.16 percent by weight Co$_3$O$_4$ and the molar proportions 0.18 NiO, 0.41 ZnO, 0.41 MgO, 0.86 Fe$_2$O$_3$ at 900° C. to 1400° C. for at least one hour under non-reducing conditions.

3. A composition of matter consisting essentially of the reaction product formed by heating an intimate mixture of 0.07 percent to 0.13 percent by weight Co$_3$O$_4$ and the molar proportions 0.18 NiO, 0.41 ZnO, 0.41 MgO, 0.86 Fe$_2$O$_3$ at 900° C. to 1400° C. for at least one hour under non-reducing conditions.

4. A composition of matter consisting essentially of the reaction product formed by heating an intimate mixture of 0.1 percent by weight Co$_3$O$_4$ and the molar proportions 0.18 NiO, 0.41 ZnO, 0.41 MgO, 0.8 to 1.0 Fe$_2$O$_3$ at 900° C. to 1400° C. for at least one hour under non-reducing conditions.

5. A composition of matter consisting essentially of the reaction product formed by heating an intimate mixture of 0.1 percent by weight Co$_3$O$_4$ and the molar proportions 0.18 NiO, 0.41 ZnO, 0.41 MgO, 0.86 Fe$_2$O$_3$ at 900° C. to 1400° C. for at least one hour under non-reducing conditions.

6. A composition of matter consisting essentially of the reaction product formed by heating an intimate mixture of 0.1 percent by weight Co$_3$O$_4$ and the molar proportions of 0.15 to 0.7 ZnO, 0.0 to 0.5 MgO, 0.05 to 0.9 NiO, 0.8 to 1.0 Fe$_2$O$_3$ for at least one hour at 900° C. to 1400° C. under non-reducing conditions.

7. A composition of matter consisting essentially of the reaction product formed by heating an intimate mixture of 0.01 percent to 0.16 percent by weight $Co_3O_4$ and the molar proportions 0.18 NiO, 0.41 ZnO, 0.41 MgO, 0.8 to 1.0 $Fe_2O_3$ at 900° C. to 1400° C. for at least one hour under non-reducing conditions.

References Cited in the file of this patent

UNITED STATES PATENTS

| | | |
|---|---|---|
| 2,656,319 | Berge | Oct. 20, 1953 |
| 2,659,698 | Berge | Nov. 17, 1953 |